Sept. 12, 1933.     S. G. SYLVAN     1,926,924

SINUOUS AIR FILTER AND MEDIUM

Filed April 30, 1928     2 Sheets-Sheet 1

Inventor
Stig G:son Sylvan
By Emil Börnelycke
Attorney

Sept. 12, 1933.   S. G. SYLVAN   1,926,924
SINUOUS AIR FILTER AND MEDIUM
Filed April 30, 1928   2 Sheets-Sheet 2

INVENTOR.
Stig G:son Sylvan
BY Arthur F. Robert
ATTORNEYS.

Patented Sept. 12, 1933

1,926,924

UNITED STATES PATENT OFFICE 1,926,924

SINUOUS AIR FILTER AND MEDIUM

Stig G:son Sylvan, Bradford, Pa., assignor, by mesne assignments, to American Air Filter Company, Inc., Louisville, Ky., a corporation of Delaware Application April 30, 1928. Serial No. 274,039

10 Claims. (Cl. 183—79)

This invention relates to a sinuous air filter and a sinuous filter medium operating on the inertia principle. In the art, two different principles for air and gas cleaning are recognized which comprise the filtration process and the inertia process. The filtration process removes solid particles only and is characterized by an effusion of air through a porous member, having interstices, smaller than the diameter, or a similar dimension of the particles to be separated. It consists simply in screening the air or gas through a sheet or bed of some suitable material.

The inertia principle upon which this invention is based is entirely different and comprises the fact that every mass, gas, liquid or solid, has a property which is called inertia. This property causes the mass to remain at rest if at rest and to preserve its motion along a straight line if moving. In other words, any moving body will continue its movement with a uniform velocity and along a straight line unless acted upon by a force. Accordingly, if an air or gas flow, containing solid or liquid particles is bent in or forced to take a curved path, the solid or liquid particles will tend to continue along a straight line and thus sooner or later will be carried out of the air or gas stream. In reality, the path of such a particle will not be a straight line due to a resistance force created when the particle is moving relative to the air. In all cases, however, the curvature of the particles will be less than that of the air flow, and the result will be similar.

It is readily seen, that with this principle, means must be provided for arresting the particles once they are extracted from the air stream.

The object of this invention is to construct a device for producing a bent air flow with a minimum resistance.

In order to produce or maintain an air flow, a pressure drop must always be applied. This pressure drop can be measured in any type of pressure unit and is called the resistance, the magnitude of which depends on the flowing fluid and on the character of the flow. The flowing fluid is, of course, always given and cannot be influenced, while the kind of flow may be influenced by suitable means.

There are two different kinds of flow: The sinuous one and the turbulent one, of which the sinuous flow is characterized by a sliding of continuous layers or strings of fluid against each other and the turbulent flow consists of numerous minute swirls, engaging the whole fluid body. Eddying and impact motions, which are opposed to a continuity of flow cannot exist in a sinuous motion. Either flow is subject to losses, equal to the work done by the resistance force and with a sinuous flow the losses are due to friction between the layers or strings. With a turbulent flow the losses are due to dissipation of energy in the swirls, i. e. direct transformation of kinetic energy into heat. The losses of a turbulent flow are always greater than those of a sinuous flow of the same velocity.

There is no sharp limit between sinuous and turbulent flow. If a flow is studied, for instance, in a tube or a trough, sinuosity of flow prevails at low velocities but by increasing the velocity, the swirls appear and vanish at a few points and with further increase in velocity the swirls become permanent and finally the whole body will be engaged in turbulence.

Heretofore, bent or deflected air flow has been obtained by repeated baffling and air filters have been composed of any kind of bodies, knitted or woven screens, beds of hairy, spongy or granular materials, sheets or metal strips, bent or perforated to form baffling surfaces, etc. The air velocities used with these filters range anywhere from 100 to 600 feet per minute but with such velocities, however, a baffling will always cause turbulence and consequently a higher resistance than would have been necessary had the flow been sinuous.

The advantage of using a great velocity through an air or gas cleaner is readily seen. The weight and space requirements of the cleaner will be smaller with greater velocities and the cleaning will be more complete. A further object of this invention resides, therefore, in a novel means for obtaining a sinuous flow.

A still further object resides in providing a filter with a multitude of sinuous plates, spaced apart by suitable means and bent to form an air passage or air passages of a certain shape.

Other objects will be apparent from the following description taken in connection with the accompanying drawings in which.

Figure 1:
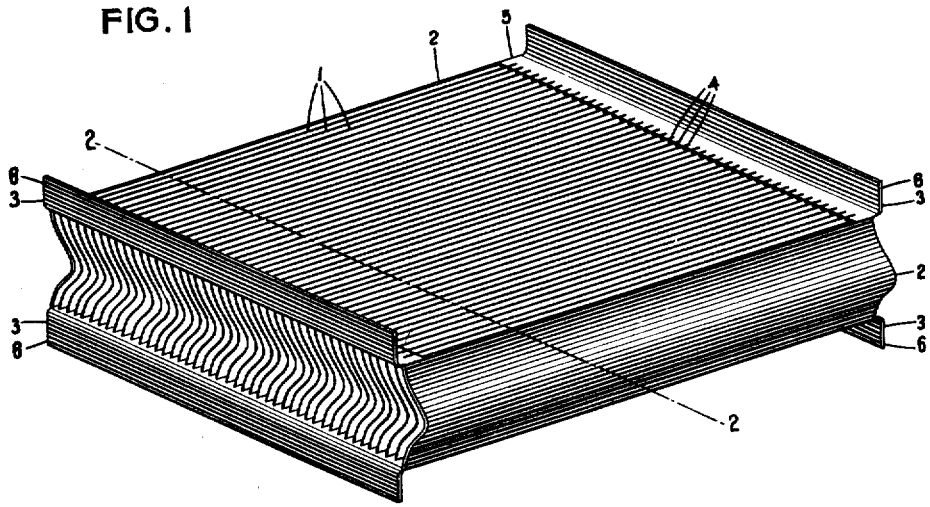
Figure 1 is a perspective view of a filter unit.

The filter unit comprises a plurality of plates 1 arranged approximately parallel to each other, and each comprising a particular shape. These plates are preferably made of sheet metal and the end plate 2 of the same shape is constructed of sheet metal of greater thickness to provide rigidity. As a matter of fact, the end plates together with the angle members 3 comprise a frame in which the plates 1 are secured. It will be evident from the drawings that by having the end plate or frame members 2 of the same shape as the filter plates 1, the space between the members 2 and the plates 1 will be of the same shape as the space between adjacent filter plates 1 and that it will, therefore, have the same flow characteristics. The advantage, obviously, of this arrangement is that the space between the end members 2 and the filter plates 1 is thereby utilized as a filtering passage. It will be noted also that these members 2 are exposed laterally outward from the unit as a whole. This has the advantage of enabling the members 2 to cooperate with the end members 2 of an adjacent unit in forming an air filter passage between such units. From this latter advantage it can be seen that the use of sealing means ordinarily required between adjacent units is eliminated and the space ordinarily sealed can be converted into an effective filtering space. The angle members 3 are preferably soldered or welded to the end plates 2, and for the purpose of receiving and securing the plates 1 the angle members have slots 4 therein in the portion 5 thereof in which the plates project and are secured therein to the angle members by welding. The plates can also be secured by butt welds, without slots in the angle members or such plates can be secured by bending a portion on the angle members and welding such portions thereto. The portion 6 of each angle member forms a flange which is at a right angle to the surface of the filter and by means of which the filter may be secured in place and handled.

As previously stated, the principal object of this invention is to provide an efficient bent flow filter or separator through which air can be blown at a high velocity without introducing turbulence to any material extent. It should be understood that turbulence has heretofore been considered an inherent and perhaps necessary flow characteristic in all practical filters utilizing a bent flow to effect the separation of contained particles. Particularly is this true of comparatively high velocity filters. Since turbulence greatly increases the resistance of any unit, and since the present invention avoids turbulence, the principal object may be said to be the production of a low resistance high velocity bent flow filter. Naturally a filter which offers low resistance at high velocities will also offer low resistance at all lower velocities.

With the foregoing in mind it may be pointed out that the plates 1 utilized in the present invention are wave shaped. Considered in a general way this shape is not new but is to be found in many constructions heretofore proposed. In all such constructions, including the one herein proposed, the area of each flow passage necessarily varies at points along its length and consequently the velocity of flow in each passage also varies, being accelerated at portions of decreasing area and retarded or decelerated at portions of increasing area. In prior constructions the change in area is carried out rapidly (or even abruptly), that is to say the portions of decreasing area decrease rapidly while the portions of increasing area increase rapidly. The present construction differs from prior constructions, mainly in the design of the portions of increasing area. I have discovered that the area of such portions cannot be increased rapidly without introducing turbulence and that turbulence can be avoided by properly designing such portions so that they increase in area more or less slowly. The reason for this will perhaps be apparent after a general consideration of the effect of a change in area.

An abrupt change in area produces turbulence in different ways, depending on whether or not the change is one of decreasing or increasing area. If the area be decreased abruptly, turbulence will be produced by virtue of the impact of the air against the surfaces of the passage. The decrease in area can, however, be made rapidly without necessarily introducing turbulence, but if made too rapidly or abruptly, turbulence will occur. If the area be increased abruptly, or even rapidly, turbulence will be produced by virtue of the ejecting action which occurs. For example, as a stream of air flows into a passage of increasing area it expands or moves radially outward at the same time. If the radial expansion in relation to the forward motion be sufficient to fill the passage completely at all portions of increasing area, then the flow will be uniform and not turbulent. If, however, it be insufficient to fill such portions completely, then the flow will not be uniform but will be characterized by eddies and swirls around the unfilled portions. Consequently, to avoid turbulence the portions of increasing area must be coordinated to the expansion occurring with the highest velocity of air which the filter is designed to pass. In other words, to avoid turbulence at any particular velocity the increase or expansion of the area should not be greater than the normal expansion of the flow through that area at that particular velocity. Of course, it will be understood that if the expansion of the area is not greater than the normal expansion of the highest velocity of flow through that area, then it will not be greater than the normal expansion of any lower velocity of flow.

Figure 2:
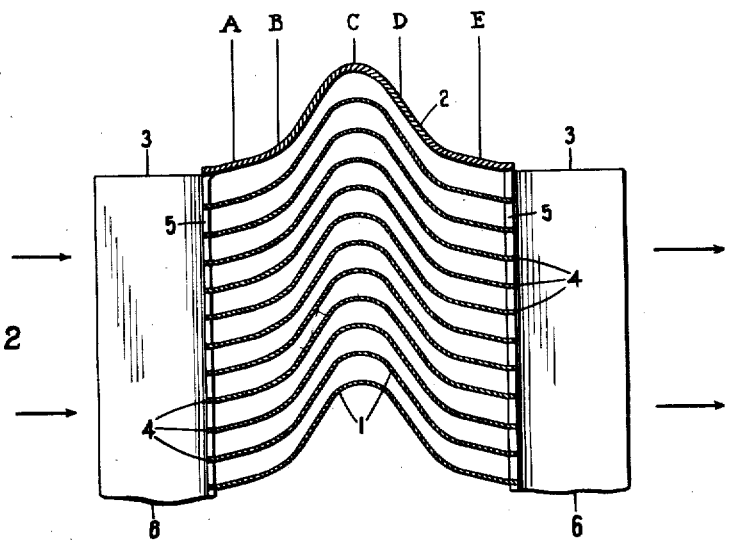
Fig. 2 is a cross section through a portion of the filter unit taken at the forward end on line 2—2 of Fig. 1.
Figure 3:
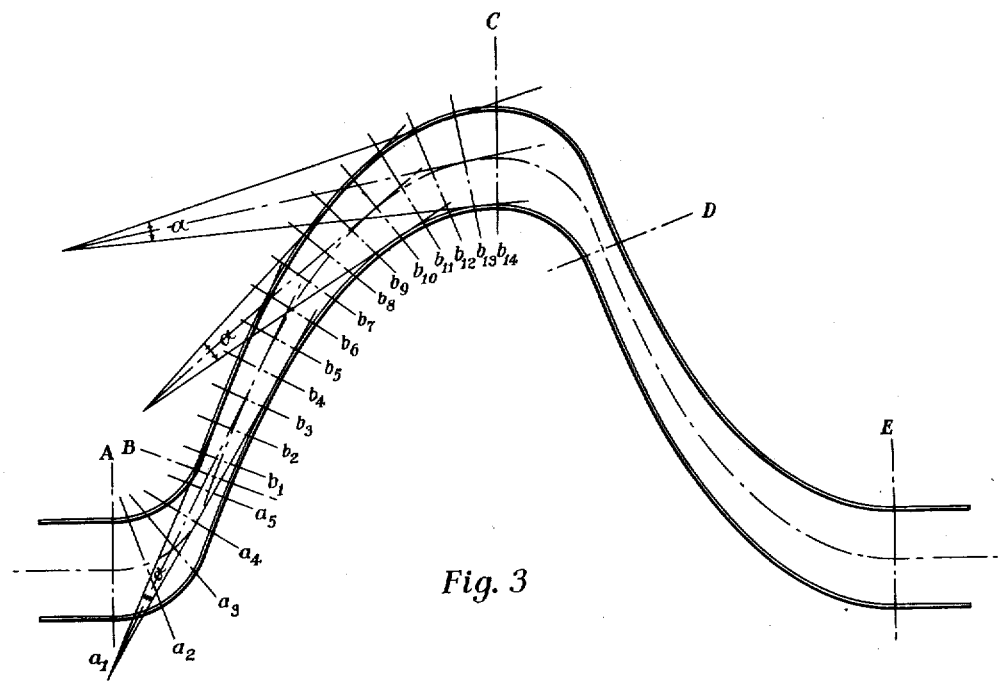
Fig. 3 is an enlarged view of a single passage such as is shown in Fig. 2.
Figure 4:
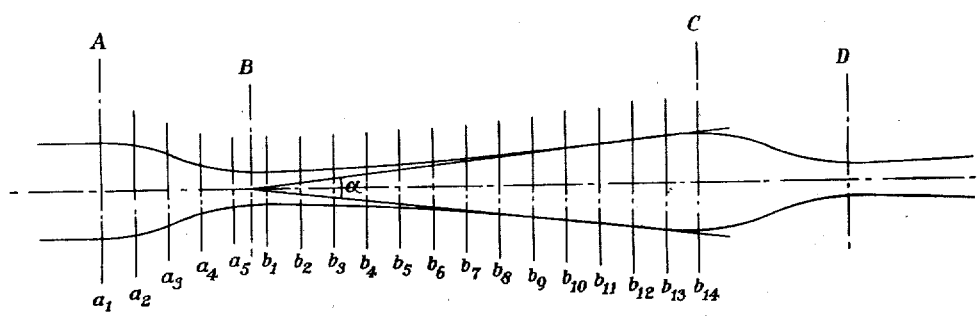
Fig. 4 is a development of the area of the passage shown in Fig. 3.

The fact that the air passage herein proposed changes in the manner stated will be better understood by reference to Figures 3 and 4. In Figure 3 a single passage constructed in accordance with the invention is shown, while in Figure 4 a development of the area of such passage is shown. In both figures, and in Figure 2 as well, the ridge-approaching part A—B—C comprises a section A—B of decreasing area and a section B—C of increasing area, while the ridge-leaving part C—D—E comprises a section C—D which is similar to A—B and a section D—E which is similar to B—C. To facilitate a comparison of the lengths of the sections of decreasing and increasing area, the sections A—B and B—C have been subdivided into a number of small portions of equal length. Now it will be noted that the acceleration of the flow is completed over a length of passage equal approximately to 5 small portions, namely $a-1$ to $a-5$ whereas the deceleration of flow is completed over a length of passage substantially equal to 14 small portions, namely $b-1$ to $b-14$. The rate at which section B—C can be made to increase in area will of course depend on the velocity. It has been determined that with an inlet or face velocity of 1000 feet per minute a fully developed turbulence will be had if the angle between the B—C portion of the plates substantially exceeds 15°. In the illustration shown this angle is less than 15° and consequently the filter shown is capable of passing a velocity somewhat higher than 1000 feet per minute without turbulence. This is of particular interest in view of the velocity limitation of turbulent flow filters. In such filters a velocity of 500 feet per minute has been considered extremely high because of the tendency of such filters to blow oil, that is to say to sweep oil from the plates into the air stream. This tendency increases with an increase in resistance while the resistance, as previously mentioned, increases with increased turbulence.

Different means may be employed for retaining the particles of dust once they have been thrown out of the flow. Usually this can be satisfactorily accomplished by coating the plates with some viscous or sticky fluid whereby the particles thrown against this coating will stick thereto and thereby become permanently removed from the air or gas.

The plates are elongated trough-shaped members having a single corrugation in its medial portion and outwardly curved ends. Also, the plates in cross-section may be defined as approximately parabolic having their ends curved outwardly at right angles to the axis of the parabola or they describe a deep catenary having outwardly curved ends.

The plates need not necessarily be secured in the frame in parallel spaced relation but a parallel arrangement is of course preferable. The width of the spaces between the plates is preferably as small as possible to efficiently remove the dust particles from the air.

Referring to the development of the air passage, the section AB in Figs. 1, 3 and 5 comprises that part in which the flow is accelerated and accordingly no turbulence is liable to occur. This part of the plate may, therefore, be bent in any way suitable for manufacture. In the section BC, the air flow is retarded and turbulence will occur if the retardation is greater than a certain number. The magnitude of the retardation is determined by the velocity and by the angle α of Fig. 5. It has been determined that with about 1000 feet per minute velocity a fully developed turbulence will be had if the angle α exceeds 15°. The sections CD and DE are equal to the sections AB and BC respectively.

The invention takes into consideration, the provision of perfectly smooth plates on the angle α exceeding 15° in no section where the air flow is retarded.

Different means may be employed for retaining the particles of dust once they have been thrown out of the flow. One method is to coat the plates with some viscuous or sticky fluid whereby the particles thrown against this coating will stick thereto and thereby permanently remove the particles from the air or gas. Another method is to construct the plates, as shown in Figs. 3 and 4, which may be coated, if desired, or the pockets alone may be coated.

The plates are elongated trough-shaped members having a single corrugation in its medial portion and outwardly curved ends. Also, the plates in cross-section may be defined as approximately parabolic having its ends curved outwardly at right angles to the axis of the parabola or they describe a deep catenary having outwardly curved ends.

The plates need not necessarily be secured in the frame in parallel spaced relation but a parallel arrangement is, of course, preferable. The width of the spaces between the plates is preferably as small as possible to efficiently remove the dust particles from the air.

I claim as my invention:—

1. A filter for separating solid or liquid particles from rapidly moving air or gases comprising a plurality of members spaced from each other and bent to form in connection with an adjacent member a passage of variable section including a curved portion of gradually increasing area, the expansion of which is not substantially greater than the normal expansion of the flow in that area.

2. A filter for separating solid or liquid particles from rapidly moving air or gases comprising a plurality of members spaced from each other, each bent to form in connection with an adjacent member a passage of variable section including a curved portion which increases in area gradually and at a rate not substantially greater than the rate at which the flow in that area will uniformly expand.

3. A filter for separating solid or liquid particles from rapidly moving air or gases, comprising a plurality of wave-shaped members which are spaced apart and curved outwardly to and inwardly from the ridges of their respective waves in a manner such as to define a passage of corresponding wave shape whose ridge-approaching and ridge-leaving portions both decrease in area and then gradually increase in area at a rate not substantially greater than the rate at which the flow in that area will uniformly expand.

4. A filter for separating solid or liquid particles from air or gases comprising a plurality of plates spaced from each other and bent to form a passage of variable section including a portion of increasing area which is curved in such a way that the angle between the plates is not substantially greater than 15°.

5. A filter for separating solid or liquid particles from air or gases according to claim 4, in which the plates are provided with curved ends corresponding with the direction of the incoming and outgoing air.

6. A device for separating solid or liquid particles from air or gases comprising a series of spaced plates bent to provide bent-flow passages, the plates at one bend extending outwardly at one side of the filter and inwardly at the other side of the filter, and a frame member at each side of the filter, said frame member being bent and spaced from the adjacent plates to provide a bent-flow passage therebetween.

7. A device for separating solid or liquid particles from air or gases comprising a series of spaced plates bent to provide bent-flow passages, the plates at one bend extending outwardly at one side of the device and inwardly at the other side thereof, and a frame for holding said plates in spaced relation, said frame including wall members which are bent to conform to the shape of the adjacent plate and spaced therefrom to provide a bent-flow passage therebetween.

8. A device for separating particles from air or gas streams having between two opposed side wall limits a plurality of air deflecting members arranged to provide along the depth of the filter tortuous air deflecting passages, the air deflecting members along the said wall limits being exposed laterally outward from the unit and arranged so that they are capable of cooperating with similar members of adjacent units to produce a filtering area therebetween.

9. A device for separating particles from air or gas streams comprising a plurality of air deflecting members arranged to provide through the depth of the filter tortuous air deflecting passages, the air deflecting members along the sides of the unit being exposed laterally outward from the unit and positioned so that they are capable of co-operating with the side deflecting members of an adjacent unit to provide a filtering passage therebetween.

10. A filter for separating solid or liquid particles from air or gases according to claim 4, in which the plates are secured in spaced relation between two end wall members having the same shape as the filter plates.

STIG G:SON SYLVAN.

CERTIFICATE OF CORRECTION.

Patent No. 1,926,924.   September 12, 1933.

STIG G:SON SYLVAN.

It is hereby certified that error appears in the printed specification of the above numbered patent requiring correction as follows: Page 3, line 33, beginning with the word "Referring" strike out all to and including "air." in line 75; and that the said Letters Patent should be read with this correction therein that the same may conform to the record of the case in the Patent Office.

Signed and sealed this 28th day of November, A. D. 1933.

F. M. Hopkins (Seal)   Acting Commissioner of Patents.

flecting members arranged to provide through the depth of the filter tortuous air deflecting passages, the air deflecting members along the sides of the unit being exposed laterally outward from the unit and positioned so that they are capable of co-operating with the side deflecting members of an adjacent unit to provide a filtering passage therebetween.

10. A filter for separating solid or liquid particles from air or gases according to claim 4, in which the plates are secured in spaced relation between two end wall members having the same shape as the filter plates.

STIG G:SON SYLVAN.

CERTIFICATE OF CORRECTION.

Patent No. 1,926,924.                                            September 12, 1933.

STIG G:SON SYLVAN.

It is hereby certified that error appears in the printed specification of the above numbered patent requiring correction as follows: Page 3, line 33, beginning with the word "Referring" strike out all to and including "air." in line 75; and that the said Letters Patent should be read with this correction therein that the same may conform to the record of the case in the Patent Office.

Signed and sealed this 28th day of November, A. D. 1933.

F. M. Hopkins (Seal)                                                    Acting Commissioner of Patents.

CERTIFICATE OF CORRECTION.

Patent No. 1,926,924.  September 12, 1933.

STIG G:SON SYLVAN.

It is hereby certified that error appears in the printed specification of the above numbered patent requiring correction as follows: Page 3, line 33, beginning with the word "Referring" strike out all to and including "air." in line 75; and that the said Letters Patent should be read with this correction therein that the same may conform to the record of the case in the Patent Office.

Signed and sealed this 28th day of November, A. D. 1933.

F. M. Hopkins (Seal) Acting Commissioner of Patents.